United States Patent
Kim

(10) Patent No.: US 9,026,049 B2
(45) Date of Patent: May 5, 2015

(54) APPARATUS AND METHOD FOR PLAYING MUSIC

(75) Inventor: Byung-Chul Kim, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 140 days.

(21) Appl. No.: 13/367,591

(22) Filed: Feb. 7, 2012

(65) Prior Publication Data

US 2012/0202424 A1    Aug. 9, 2012

(30) Foreign Application Priority Data

Feb. 7, 2011 (KR) .................. 10-2011-0010812

(51) Int. Cl.
*H04B 5/00* (2006.01)
*H04M 1/725* (2006.01)

(52) U.S. Cl.
CPC ........ *H04M 1/7253* (2013.01); *H04M 1/72558* (2013.01); *H04M 2250/04* (2013.01)

(58) Field of Classification Search
USPC .......... 455/41.1, 41.2, 179.1, 205, 434, 552.1
See application file for complete search history.

(56) References Cited

U.S. PATENT DOCUMENTS

| | | | | |
|---|---|---|---|---|
| 7,496,327 | B2 * | 2/2009 | Nagamoto et al. | 455/3.01 |
| 8,145,277 | B2 * | 3/2012 | Sweeney et al. | 455/567 |
| 2006/0286951 | A1 * | 12/2006 | Nagamoto et al. | 455/186.1 |
| 2008/0125037 | A1 * | 5/2008 | Ibrahim et al. | 455/41.2 |
| 2010/0216480 | A1 * | 8/2010 | Park et al. | 455/450 |

* cited by examiner

*Primary Examiner* — Tuan H Nguyen
(74) *Attorney, Agent, or Firm* — Cha & Reiter, LLC.

(57) ABSTRACT

Provided is an apparatus and method for playing music, which can play music by simply sharing the music with an external device. An apparatus for playing music includes a first portable terminal and a second portable terminal. The first portable terminal transmits FM channel information of an FM transmitter, which is set to broadcast in-play music thereof, and an FM radio application execution command through near field communication (NFC). The second portable terminal receives the FM channel information and the FM radio application execution command from the first portable terminal through the NFC, then executes the FM radio application based on the FM channel information to receive and play the music broadcasted from the first portable terminal.

20 Claims, 6 Drawing Sheets

APPARATUS AND METHOD FOR PLAYING MUSIC

CLAIM OF PRIORITY

This application claims the benefit under 35 U.S.C. §119 of a Korean Patent Application filed in the Korean Intellectual Property Office on Feb. 7, 2011 and assigned Serial No. 10-2011-0010812, the entire disclosure of which is hereby incorporated by reference.

BACKGROUND OF THE INVENTION

1. Field of the Invention

The present invention relates generally to an apparatus and method for playing music, and more particularly, to an apparatus and method for sharing the music during a play mode with an external device.

2. Description of the Related Art

Portable terminals typically have an FM receiver for receiving FM (Frequency Modulation) radio broadcast and an FM transmitter for transmitting FM radio broadcast.

The FM transmitter of the portable terminal can broadcast in-play music (or music being played) via a predetermined FM channel (frequency), and can also broadcast Radio Data System (RDS) or Radio Broadcast Data System (RBDS) via the same channel. Hence, the portable terminal serves as an FM radio station using an FM radio chipset capable of performing an FM transmission function.

However, because an FM transmitter of a portable terminal unilaterally transmits FM radio broadcast, the receiving terminal must detect the FM channel of the FM transmitter in order to receive music broadcasted therefrom. Thus, the user is inconvenienced by having to manually tune the FM channel of the FM receiver to the FM channel of the FM transmitter.

SUMMARY OF THE INVENTION

An exemplary embodiment of the present invention is to provide an apparatus and method for playing music and simultaneously share the music with another external device.

According to an aspect of the present invention, an apparatus for playing music includes: a first portable terminal for transmitting Frequency Modulation (FM) channel information of an FM transmitter, which is set to broadcast in-play music thereof, and an FM radio application execution command through near field communication (NFC); and a second portable terminal for receiving the FM channel information and the FM radio application execution command from the first portable terminal through the NFC, executing the FM radio application set by the FM channel information, and receiving and playing the music broadcasted from the first portable terminal.

According to another aspect of the present invention, a method for playing music includes: transmitting Frequency Modulation (FM) channel information of a first FM transmitter, which is set to broadcast in-play music thereof, and an FM radio application execution command from a first portable terminal to a second portable terminal through near field communication (NFC); and upon receiving the FM channel information and the FM radio application execution command from the first portable terminal through the NFC, executing the FM radio application set by the FM channel information and receiving and playing the music broadcasted from the first portable terminal.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF THE INVENTION

Figure 1:
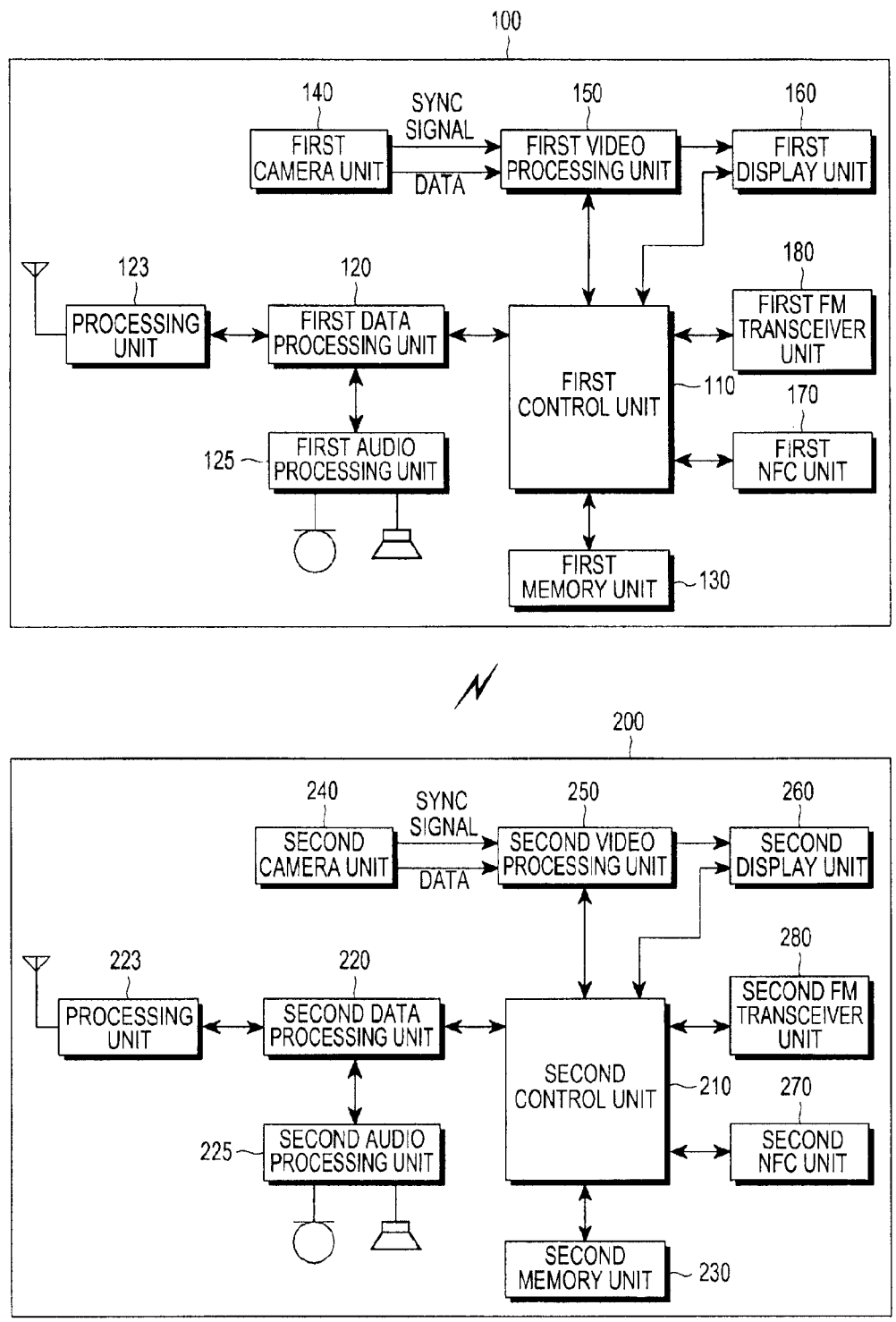
FIG. 1 is a block diagram illustrating a first portable terminal and a second portable terminal according to an exemplary embodiment of the present invention.

Exemplary embodiments of the present invention will be described below in detail with reference to the accompanying drawings. Like reference numerals in the drawings denote like elements. The present invention may, however, be embodied in different forms and should not be construed as limited to the embodiments set forth herein; rather, these embodiments are provided so that this disclosure will be thorough and complete, and will fully convey the scope of the present invention to those skilled in the art.

As it will be explained in details hereinafter, according to an exemplary embodiment of the present invention, a first portable terminal broadcasts its in-play music and a second portable terminal plays the in-play music of the first portable terminal in a shared manner. However, it should be noted that the teachings of the present invention may also be applicable to external devices (e.g., car audio systems and cassettes) that include an FM transceiver and a near field communication (NFC) unit.

In the embodiment of the present invention, a first portable terminal broadcasts its in-play music and a second portable terminal receives and plays the in-play music of the first portable terminal. However, the present invention may be also applicable to the case where the second portable terminal broadcasts its in-play music and the first portable terminal receives and plays the in-play music of the second portable terminal.

FIG. 1 is a block diagram illustrating a first portable terminal and a second portable terminal according to an exemplary embodiment of the present invention.

Referring to FIG. 1, a first portable terminal 100 according to an exemplary embodiment of the present invention includes a first control unit 110, a first data processing unit 120, a first radio frequency (RF) unit 123, a first audio processing unit 125, a first memory unit 130, a first camera unit 140, a first video processing unit 150, a first display unit 160, a first NFC unit 170, and a first FM transceiver unit 180.

In operation, the first RF unit 123 performs a wireless communication function of the portable terminal. The first RF unit 123 includes an RF transmitter for upconverting and amplifying a transmission (TX) signal, and an RF receiver for low-noise-amplifying and downconverting a received (RX) signal. The first data processing unit 120 includes a transmitter for encoding and modulating the TX signal, and a receiver for demodulating and decoding the RX signal. For example, the first data processing unit 120 includes a modem and a codec. Herein, the codec includes a data codec for processing packet data, and an audio codec for processing audio signals (e.g., voice signals). The first audio processing unit 125 processes an RX audio signal outputted from the audio codec of the first data processing unit 120, and transmits a TX audio signal, generated by a microphone, to the audio codec of the first data processing unit 120.

The first memory unit 130 may include a program memory and a data memory. The program memory may store programs for controlling a general operation of the first portable terminal 100, and programs for transmitting FM channel information of an FM transmitter, which is configured to broadcast in-play music, and an FM radio application execution command through the first NFC unit 170 to a second portable terminal 200.

The first control unit 110 controls an overall operation of the first portable terminal 100.

According to an exemplary embodiment, when the FM transmitter is enabled in a music play mode, the first control unit 110 is configured to broadcast in-play music on the basis of the FM channel information. Herein, the first control unit 110 may be configured to broadcast not only the in-play music but also radio text (RT) information about the in-play music.

Radio Data System (RDS) denotes digital information carried in FM radio transmission standardized by European Broadcasting Union (EBU). Examples of the RDS include Program Service (PS), Alternative Frequency (AF), Radio Text (RT), Travel Announcement (TA), and Traffic Program (TP). The RT is plain text information such as Song Title and Singer Name.

According to an exemplary embodiment, when the FM transmitter is enabled, the first control unit 110 connects to the second portable terminal 200 through the first NFC unit 170 using a NFC protocol and transmits FM channel information of the FM transmitter, which is broadcasting the in-play music, and an FM radio application execution command to initiate the second portable terminal 200 to play the same in-play music using the FM channel broadcast by the first portable terminal 110.

According to an exemplary embodiment, when a sound mute function is selected for the in-play music, the first control unit 110 controls the first portable terminal 100 mutes its audio output but continue to broadcast the in-play music through the FM transmitter So that the second terminal 200 continue to play the in-play music broadcast by the first portable terminal 110.

When music is broadcasted on the basis of the FM channel information of the FM transmitter, the first NFC unit 170 connects to the second portable terminal 200 with a second NFC unit 270 to transmit the FM radio information and the FM radio application execution command to the second portable terminal 200.

The first FM transceiver unit 180 includes the first FM transmitter and a first FM receiver. The first FM transmitter broadcasts and receives the in-play music of the first portable terminal 100 using a particular FM channel specified in the FM channel information.

The first camera unit 140 includes a camera sensor for capturing video data and converting the video data into an electrical signal, and a signal processing unit for converting an analog video signal, captured by the camera sensor, into digital data. The camera sensor may include a CCD sensor or a CMOS sensor, and the signal processing unit may include a digital signal processor (DSP). Also, the camera sensor and the signal processing unit may be integrated into one unit, or may be separated from each other.

The first video processing unit 150 performs an image signal processing (ISP) operation to display video signals, outputted from the first camera unit 140, on the first display unit 160. Examples of the ISP operation include gamma correction, interpolation, spatial change, image effects, image scaling, auto white balance (AWB), auto exposure (AE), and auto focus (AF). The first video processing unit 150 processes the video signals, outputted from the first camera unit 140, on a frame basis, and outputs the frame video data according to the size and characteristics of the first display unit 160. Also, the first video processing unit 150 includes a video codec to compress the frame video data displayed on the first display unit 160 and restore the compressed frame video data into the original frame video data. The video codec may include a JPEG codec, an MPEG4 codec, or a Wavelet codec. The first video processing unit 150 may have an on-screen display (OSD) function to output OSD data in accordance with a display screen size under the control of the first control unit 110.

The first display unit 160 displays the video signal outputted from the first video processing unit 150, and displays the user data outputted from the first control unit 110. The first display unit 160 may be implemented using an LCD. If the first display unit 160 is implemented using an LCD, the first display unit 160 may include an LCD, an LCD controller, and a memory for storing video data. The LCD may be a touchscreen LCD. If the LCD is a touchscreen LCD, it may also operate as an input unit. Also, the first display unit 160 may display keys of a key input unit.

Referring to FIG. 1, a second portable terminal 200 according to an exemplary embodiment of the present invention includes a second control unit 210, a second data processing unit 220, a second radio frequency (RF) unit 223, a second audio processing unit 225, a second memory unit 230, a second camera unit 240, a second video processing unit 250, a second display unit 260, a second NFC unit 270, and a second FM transceiver unit 280.

The second memory unit 230 may include a program memory and a data memory. The program memory may store programs for controlling a general operation of the second portable terminal 200. According to an exemplary embodiment, the second memory unit 230 may store programs for receiving and playing the music broadcasted from the first portable terminal 100, by executing the FM radio application set by the FM channel information, in response to the FM radio application execution command and the FM channel information received from the first portable terminal 100 connected through the second NFC unit 270.

The second control unit 210 controls an overall operation of the second portable terminal 200.

According to an exemplary embodiment, when receiving the FM channel information and the FM radio application execution command from the first portable terminal 100 connected through the second NFC unit 270, the second control unit 210 executes the FM radio application set by the FM channel information to receive and play the in-play music broadcasted through the first FM transceiver 180 of the first portable terminal 100 through the FM receiver, which is set by the FM channel information received therein.

Herein, according to an exemplary embodiment, the second control unit 210 receives not only the music but also RT information about the music from the first portable terminal 100 through the FM receiver and displays the same on the display unit 260.

The second NFC unit 270 connects to the first portable terminal 100 with the first NFC unit 170 to receive the FM channel information and the FM radio application execution command.

The second FM transceiver unit 280 includes the second FM transmitter and a second FM receiver. The second FM transmitter broadcasts music on the basis of the FM channel information, and the first FM receiver receives the music, which is broadcasted from the first FM transceiver 180 of the first portable terminal 100, on the basis of the FM channel information.

According to an exemplary embodiment, the second display unit 260 may display the song title and singer name of the in-play music extracted from the RF information received from the first portable terminal 100, while the second portable terminal 200 is receiving and playing the music broadcasted from the first portable terminal 100.

The second camera unit 240, the second video processing unit 250, the second RF unit 223, the second data processing unit 220 and the second audio processing unit 225 of the second portable terminal 200 perform the same operations as the first camera unit 140, the first video processing unit 150, the first RF unit 123, the first data processing unit 120 and the first audio processing unit 125 of the first portable terminal 100, and thus a detailed description thereof is not provided herein to avoid redundancy.

Now, a process for playing shared music in the first portable terminal 100 and the second portable terminal 200 according to an exemplary embodiment of the present invention will be described below in detail with reference to FIGS. 2 and 3A to 3G.

Figure 2:
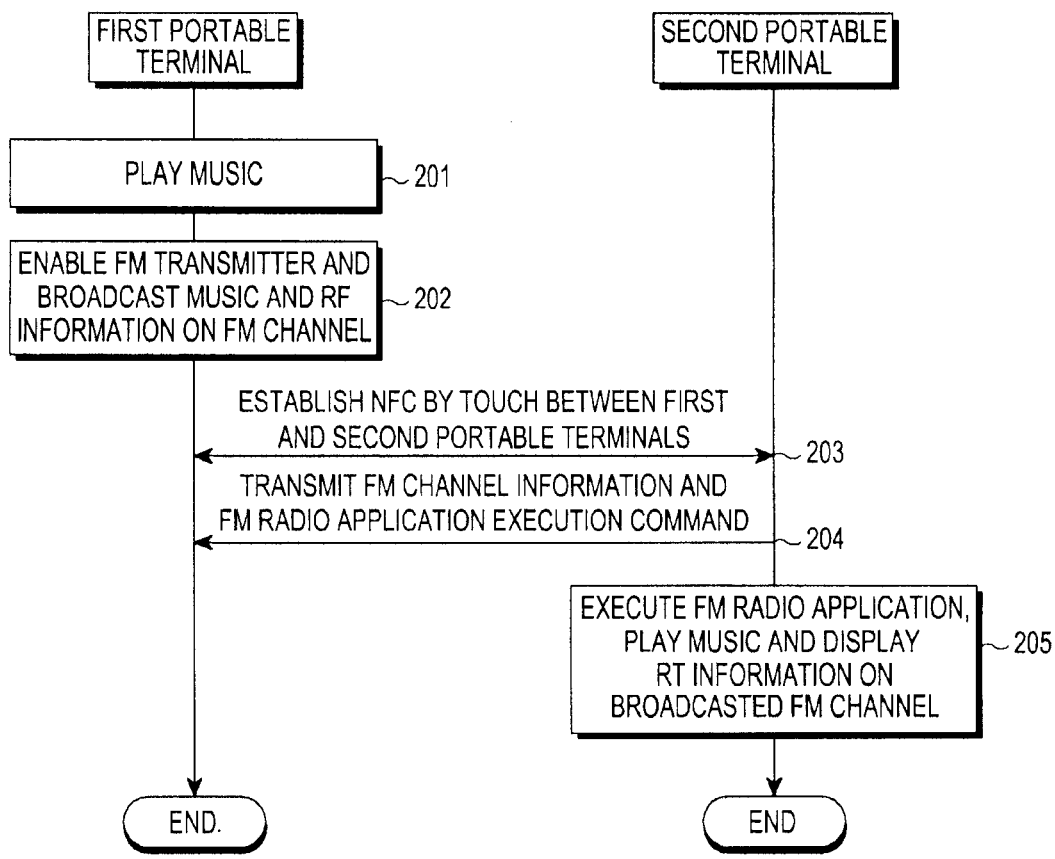
FIG. 2 is a flow diagram illustrating a process for playing shared music in the first portable terminal and the second portable terminal according to an exemplary embodiment of the present invention.

FIG. 2 is a flow diagram illustrating a process for playing shared music in the first portable terminal and the second portable terminal according to an exemplary embodiment of the present invention. FIGS. 3A to 3G are diagrams for describing the process of FIG. 2.

Referring to FIG. 2, in step 201, the first control unit 110 plays the music selected by a user during a music play mode of the first portable terminal 100.

Figure 3A:
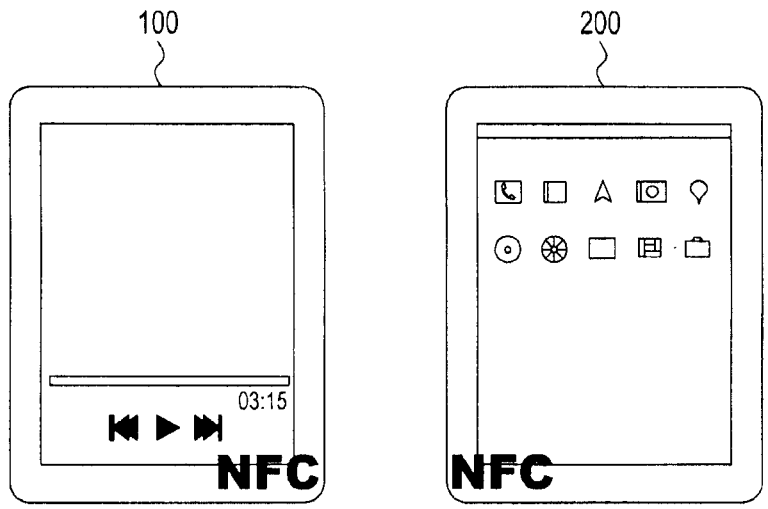
FIGS. 3A to 3G are diagrams for describing the process of FIG. 2.
Figure 3B:
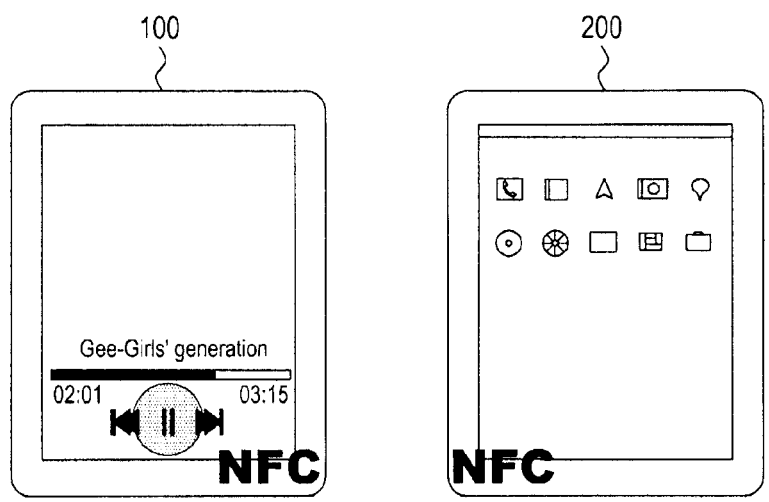

FIG. 3A illustrates a music play mode of the first portable terminal 100, and FIG. 3B illustrates an operation of playing the music selected by the user in the music play mode of the first portable terminal 100.

When the first FM transmitter is enabled by the user's selection during the playing of music in step 201, the first control unit 110 broadcasts the in-play music via the FM channel (frequency) of the first FM transmitter in step 202.

In step 202, the first control unit 110 may broadcast not only the music but also RF information about the music on the FM channel (frequency) of the first FM transmitter, and the FM channel may be set by the user.

Figure 3C:
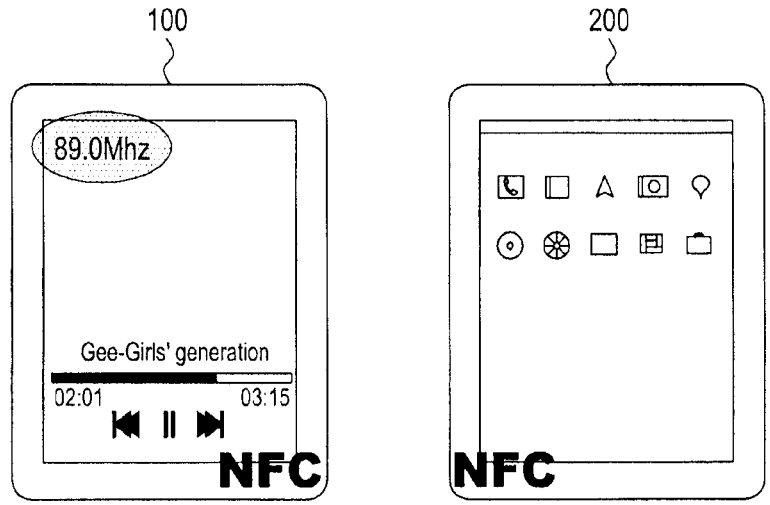

FIG. 3C illustrates an illustrative operation of broadcasting the in-play music on a predetermined FM channel (e.g., 89.0 MHz).

When the first portable terminal 100, which is in an idle state with the first NFC unit 170 initialized, and the second portable terminal 200, which is in an idle state with the second NFC unit 270 initialized, are touched together or connects via a near field communication protocol, the first portable terminal 100 and the second portable terminal 200 search each other and establish NFC in step 203.

With the NFC established between the first portable terminal 100 and the second portable terminal 200, the first control unit 110 of the first portable terminal 100 transmits FM channel information about the in-play music and an FM radio application execution command to the second portable terminal 200 in step 204.

Figure 3D:
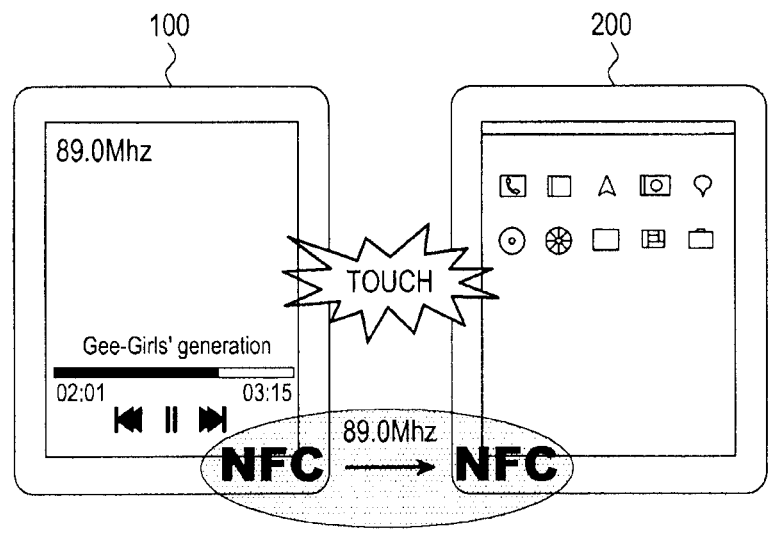

FIG. 3D illustrates an operation of transmitting the FM channel information and the FM radio application execution command from the first portable terminal 100 to the second portable terminal 200 with the NFC established between the first portable terminal 100 and the second portable terminal 200.

When receiving the FM channel information and the FM radio application execution command from the first portable terminal 100 through the NFC, the second control unit 210 of the second portable terminal 200 executes the FM radio application according to the FM channel information received therein, in step 205.

In step 205, the second control unit 210 receives music and RT information about the music, broadcasted by the first FM transmitter of the first portable terminal 100, through the second FM receiver of the second portable terminal 200 set according to the FM channel information of the first FM transmitter of the first portable terminal 100, and displays the RT information on the second display unit 260 while playing the music.

Figure 3E:
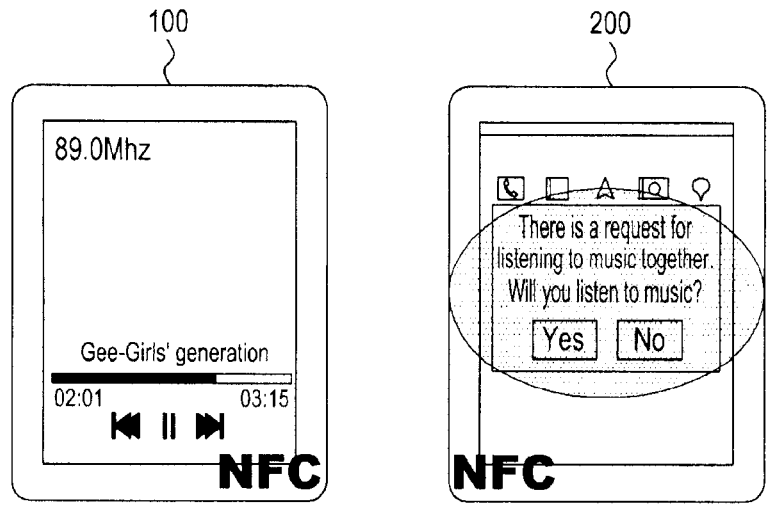

FIG. 3E illustrates a message window that is displayed on the second display unit 260 of the second portable terminal 200 to ask whether to receive and play the music, broadcasted by the first portable terminal 100, according to the FM radio application execution command received from the first portable terminal 100.

Figure 3F:
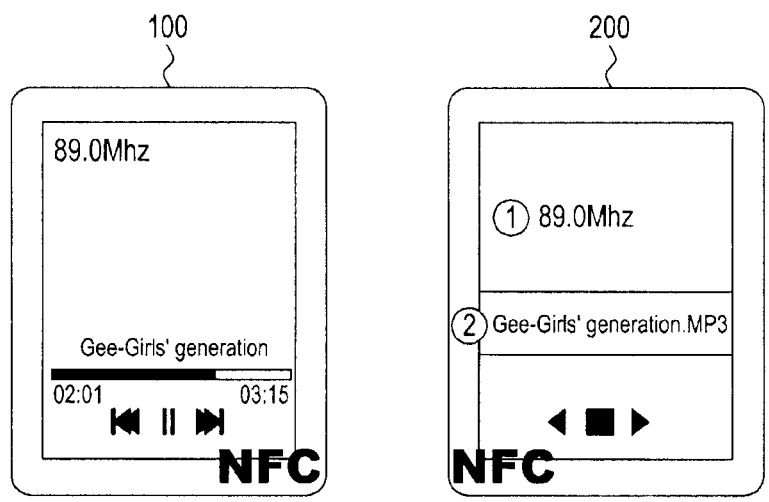

FIG. 3F illustrates a process in which, when "Yes" is selected in FIG. 3E, the first portable terminal 100 broadcasts music through the first FM transmitter while playing the music in a music play mode, and the second portable terminal 200 receives the music broadcasted through the first FM transmitter of the first portable terminal 100 and RT information about the music, plays the music and display the RT information.

When a sound mute function of the first portable terminal 100 is selected while the first portable terminal 100 and the second portable terminal 200 are playing the shared music, the first portable terminal 100 mutes the sound of the in-play music by silencing its speaker but the second portable terminal 200 continue to receive and play the in-play music of the first portable terminal 100.

In the exemplary embodiment of the present invention, the second portable terminal 200 receives and plays the music broadcasted by the first portable terminal 100. However, any other device(s) having an NFC unit and an FM transceiver unit may also receive and play the music broadcasted by the first portable terminal 100, so that a plurality of devices can receive and play the music broadcasted by the first portable terminal 100.

Figure 3G:
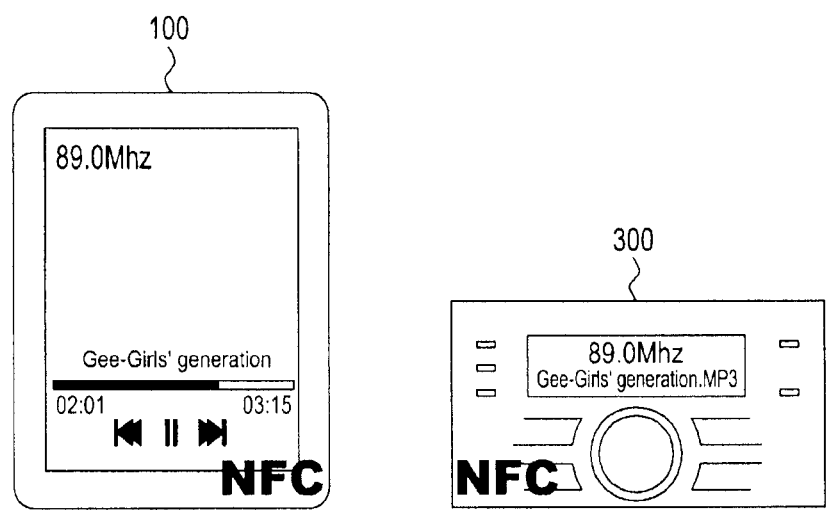

For example, as illustrated in FIG. 3G, a car audio system 300 having an NFC unit and an FM transceiver unit can receive and play the music broadcasted by the first portable terminal 100 mounted on a supporter in a car. Also, the music can be played with high sound quality by the car audio system 300 when a sound mute function of the first portable terminal 100 is selected by the user. By receiving the FM channel information of the first portable terminal through the NFC unit, the car audio system 300 can receive and play the music broadcasted by the first portable terminal 100, wherever the first portable terminal 100 is located in the car without being mounted on the supporter or physically connected thereto.

As described above, the present invention provides a music playing apparatus and method in which a portable terminal playing music uses an NFC unit to transmit FM channel information and an FM radio application execution command to an external device, thereby making it possible to wirelessly share the music with a plurality of external devices without using a physical cable.

Also, the NFC unit is used to share the FM radio channel (frequency) with an external device. Thus, it is not necessary to detect FM radio channel (frequency) information or to manually set a desired FM channel by searching an FM radio application in a top-down manner. Moreover, after the establishment of two terminals, the transmitting terminal can be silenced while the receiving terminal can continue to replay the music. Further, when the portable terminal playing the music is mounted on a supporter in a car, the NFC coverage of the NFC unit is maintained between the portable terminal and a car audio system. Thus, the music transmitted from the portable terminal can be played without the need to connecting a music storage medium (e.g., a USB memory or a CD) to the car audio system.

Note that the above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to exemplary embodiments thereof, it will be understood by those skilled in the art that various changes in form and details may be made therein without departing from the spirit and scope of the invention as defined by the appended claims Therefore, the scope of the invention is defined not by the detailed description of the invention but by the appended claims, and all differences within the scope will be construed as being included in the present invention.

What is claimed is:

1. A portable terminal comprising:
a short-range communication unit; and
a controller configured to, upon receiving channel information for reception of music being broadcasted, from another portable terminal connected through the short-range communication unit, set up a channel of an application for reception of music corresponding to the received channel information, receive the music being broadcasted, over the set channel, and output the received music.

2. The portable terminal of claim 1, wherein the controller executes the application for reception of music, upon receiving an execution command of the application for reception of music through the short-range communication unit along with the channel information.

3. The portable terminal of claim 1, wherein the controller displays music information while outputting the music, upon receiving the music information for the music being broadcasted, over the set channel along with the music being broadcasted.

4. The portable terminal of claim 1, further comprising a transceiver configured to receive at least one of the music being broadcasted and the music information for the music being broadcasted, over a channel set up the application for reception of music.

5. The portable terminal of claim 1, wherein the short-range communication unit includes Near Field Communication (NFC).

6. A portable terminal comprising:
a short-range communication unit; and
a controller configured to transmit information about a channel over which music being broadcasted can be received, to another portable terminal connected through the short-range communication unit, while broadcasting music being played.

7. The portable terminal of claim 6, wherein the controller transmits an execution command of an application for reception of the music to another portable terminal through the short-range communication unit along with the channel information.

8. The portable terminal of claim 6, wherein the controller broadcasts the music being played, along with music information for the music being played.

9. The portable terminal of claim 6, wherein the controller mutes sound of the music while keeping the broadcasting of the music, if a sound mute function is selected while broadcasting the music being played.

10. The portable terminal of claim 6, further comprising a transceiver configured to broadcast at least one of the music being played and music information for the music being played.

11. The portable terminal of claim 6, wherein the short-range communication unit includes Near Field Communication (NFC).

12. A method for playing music in a portable terminal, the method comprising:
upon receiving channel information for reception of music being broadcasted, from another portable terminal connected through a short-range communication unit, setting up a channel of an application for reception of music corresponding to the received channel information; and
receiving the music being broadcasted, over the set channel, and outputting the received music.

13. The method of claim 12, further comprising executing the application for reception of music, upon receiving an execution command of the application for reception of music through the short-range communication unit along with the channel information.

14. The method of claim 12, wherein the outputting comprises displaying music information while outputting the music, upon receiving the music information for the music being broadcasted, over the set channel along with the music being broadcasted.

15. The method of claim 12, wherein the short-range communication unit includes Near Field Communication (NFC).

16. A method for playing music in a portable terminal, the method comprising:
broadcasting music being played; and
transmitting information about a channel over which the music being broadcasted can be received, to another portable terminal connected through a short-range communication unit, while broadcasting the music being played.

17. The method of claim 16, further comprising transmitting an execution command of an application for reception of the music to another portable terminal through the short-range communication unit along with the channel information.

18. The method of claim 16, wherein the broadcasting comprises broadcasting the music being played, along with music information for the music being played.

19. The method of claim 16, further comprising muting sound of the music while keeping the broadcasting of the music, if a sound mute function is selected while broadcasting the music being played.

20. The method of claim 16, wherein the short-range communication unit includes Near Field Communication (NFC).

* * * * *